March 21, 1961 A. KRASSOIEVITCH ET AL 2,976,470
HORAL INSTRUMENT OF HIGH PRECISION
Filed Nov. 20, 1958
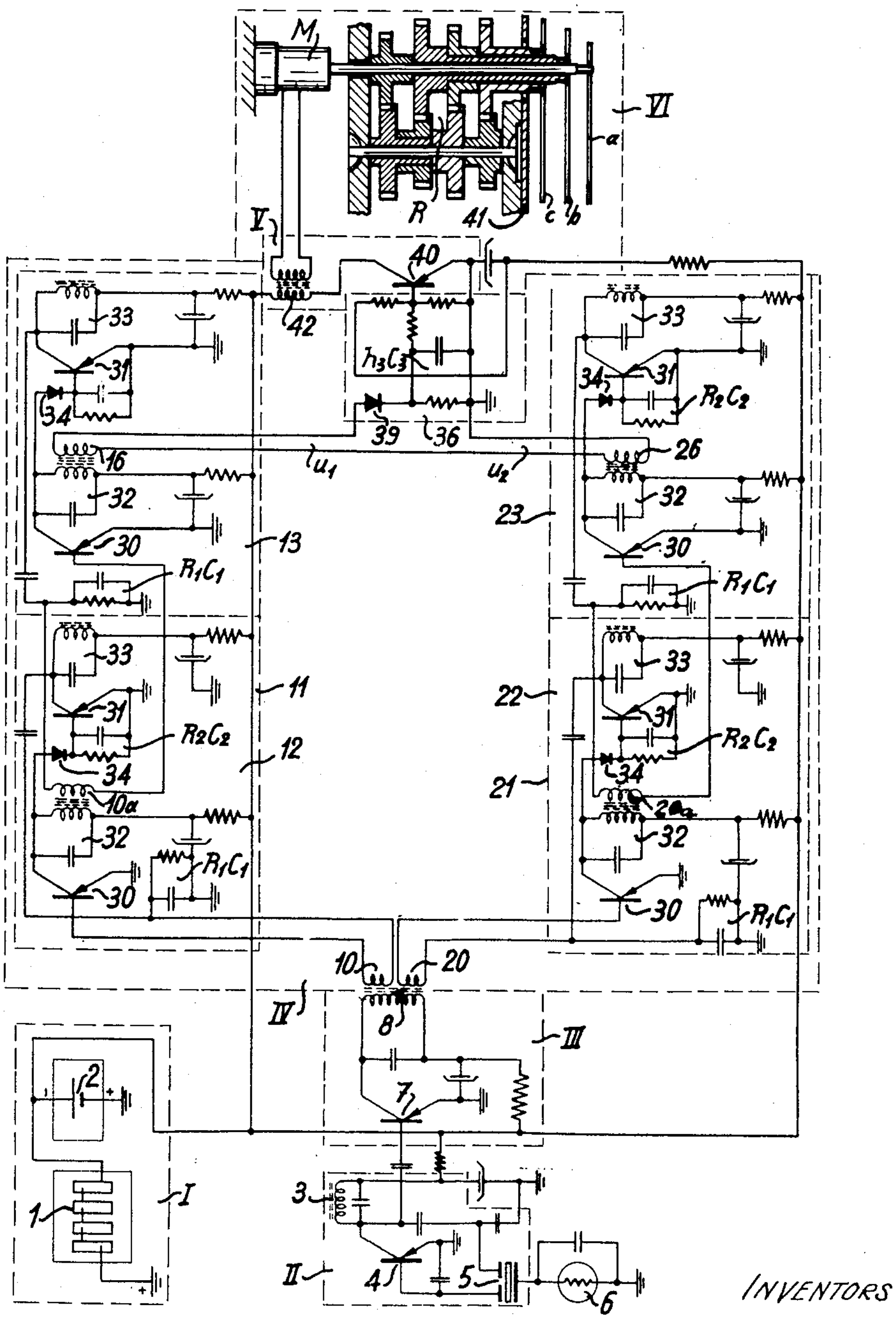
INVENTORS
ANDRE KRASSOIEVITCH
ROGER BRUNNER
BY Irwin S. Thompson
ATTY.

United States Patent Office 2,976,470
Patented Mar. 21, 1961

2,976,470

HORAL INSTRUMENT OF HIGH PRECISION

André Krassoievitch and Roger Brunner, Geneva, Switzerland, assignors to Ancienne Manufacture d'Horlogerie Patek, Philippe & Co. S.A., Geneva, Switzerland, a body corporate of Switzerland Filed Nov. 20, 1958, Ser. No. 775,294

Claims priority, application Switzerland Dec. 28, 1957

5 Claims. (Cl. 318—341)

The present invention has for its object a horal instrument of high precision, that is to say the variation of which during 24 hours is smaller than 1/10 of second, which is characterized by the fact that it comprises a thermo-compensated quartz oscillator, the frequency of which is higher than 500 cycles/sec., and an electronic frequency dividing device presenting, on the one hand, two parallel division stages and, on the other hand, a device for mixing the two output frequencies and the filtering of the beat low frequency of both output frequencies, and wherein said low frequency controls a horal indicating device.

The attached drawing shows schematically and by way of example the electrical and mechanical diagram of a preferred embodiment of the horal instrument especially designed for a very small current consumption (lower than fifteen milliwatts), in order to enable its operation by means of an independent supply device.

According to the attached drawing, said instrument comprises:

(1) A supply device 1, comprising photovoltaic cells 1 (photocells) to recharge a source of direct current of constant voltage between 0.9 and 6 volts, constituted by an accumulator such as battery 2. These cells 1 can be sensitive to any undulatory electro-magnetic radiation (light rays, infrared rays, ultra-violet rays, etc.), as well as to corpuscular radiations (electrons, ions, $\alpha$ and $\psi$ particles).

(2) A standard oscillator II, the frequency of which is higher than 500 cycles/sec. and preferably between 2,000 and 20,000 cycles/sec., but could also reach several megacycles per second. This oscillator presents a load oscillating circuit 3 and a transistor 4, controlled by a quartz crystal 5. The transistor 4 is preferably a junction transistor connected in a well-known manner, but so as to obtain a maximum of stability for a minimum of consumption. The oscillating circuit 3 comprises an induction coil with a core of fritted material or of high magnetic permeability. Said induction coil is composed of a coil mounted on a magnetic circuit the core of which is made either by an entirely closed pot of fritted material, or by a tore made of a material of high magnetic permeability. This kind of magnetic circuit having practically no leakage and due to the high magnetic permeability of the utilized material, there is obtained an induction coil of very high value and of very small overall size.

In certain cases it may be of advantage, particularly when the feeding voltage is little (i.e. about one volt only) and also according to the kind of quartz used, to incorporate a supplementary transisitor into the circuit of the oscillator, in order to realize better working conditions, better adapted impedance supplementary amplification, improved thermic stability etc.

Furthermore, the thermic characteristics of the various elements of said oscillator, and particularly of the quartz crystal 5, are improved by the adjunction of elements 6 of inversed thermic characteristics (thermistor for instance) which form a static and dynamic thermic compensation and save generally the necessity of providing thermostatic devices, such as those generally used in precision quartz clocks, the electric energy consumption of which is too high to permit a supply of photo-sensitive cells and which, besides, requires the mounting of the oscillator inside a thermostatic enclosure.

(3) A coupling stage III comprising a junction transistor 7 which supplies the primary winding of a coupling transformer 8 comprising two secondary windings 10 and 20. The transistor 7 is connected so as to require a minimum of consumption, that is to say with the smallest possible permanent quiescent current utilizing an "auto-polarized transistor." The coupling stage secures an entire independence of the working of the oscillator II with respect to the perturbations to which it would be submitted by the following division stages.

(4) An electronic dividing device IV for the division of the frequency of the oscillator II. The dividing device IV comprises, on the one hand, two branches 11 and 21 each showing two division stages 12, 13 and 22, 23 and, on the other hand, a device 36 for the mixing of both the output frequencies and the filtering of the beat frequency.

In the represented example, each division stage is of the type called "with regeneration" and presents:

(*a*) A first circuit, comprising essentially a transistor 30, an oscillating circuit 32, a circuit $R_1C_1$ and the secondary winding 10 of the transformer 8 or a secondary winding 10*a* connected with the oscillating circuit 32. This first circuit performs the three following operations: modulation by the secondary winding 10 or 10*a* respectively 20 or 20*a* and the constant $R_1C_1$, amplification by the transistor 30 and selection of the divided frequency by the oscillating circuit 32.

(*b*) A second circuit comprising a diode 34 and a circuit $R_2C_2$ and which performs the generation of harmonics of the divided frequency.

(*c*) A third circuit comprising a transistor 31 and an oscillating circuit 33. The transistor 31 performs the amplification of the harmonics of the divided frequency, and the selection among these harmonics of the one leading to the desired division factor is by the oscillating circuit 33.

Here, also, the induction coils of the oscillating circuits are either of the type with closed pot made out of fritted material, or of the tore type made out of a material of high magnetic permeability.

The mixing and filtering device 36 is connected by two secondary windings 16 and 26 on the output of each branch 11 and 21 and comprises a current rectifier 39 with a circuit $R_3C_3$ operating as a detector of the beat frequency.

(5) An amplifier V comprising a junction transistor 40 which amplifies the beat frequency and a coupling transformer 42 located between the transistor 40 and a motor M.

(6) A horal indicating device VI, which comprises the motor M, of the synchronous or current impulses type, fed by the amplifier V, a mechanical transmission device R driven by the motor M and driving hands *a*, *b*, *c*, of a horal indicator, which are moving opposite a dial 41 and indicate the hours, minutes and seconds.

The operation of the described high precision horal instrument is according to the following:

When the photo-sensitive cells 1 are irradiated, for example by light rays, they produce an electric current which charges the accumulator battery 2. The photo-sensitive cells 1 are, for example, of the known type of silicon, selenium or germanium; their number, their connection and their arrangement are chosen in order to obtain for a given surface the best possible conditions for transferring the energy to the battery 2, which is, for example, of the type zinc-silver or tight alkaline cell, having a high capacity per unity of volume and the open circuit voltage of which may have a value comprised between 0.9 and 6 volts. The voltage is chosen in order to obtain the best of the following conditions:

(*a*) Working security.
(*b*) Lowest current consumption.
(*c*) Conditions of arrangement, connection and illumination easy to provide.

Thus for instance, with a source of current constituted by a battery 2 having an open circuit voltage of 1.5 volts, good results have been obtained with twenty photo-sensitive cells of silicon connected in series, each having an illumination surface of 1 $cm.^2$. These cells can easily be disposed side by side in the same plane or in any manner with emphasis on conservation of space.

The battery 2 constitutes a source of direct current of constant voltage and also an electric energy storage. The oscillator II fed by the battery 2 oscillates with a constant frequency F of, for example, 10,000 cycles per second. Each branch 11, 21 of the division device IV is fed by this frequency F of 10,000 cycles per second. The coefficients of the division stages are, in the present example, the following:

(1) Stage 12 division ratio $K_1=4$.
(2) Stage 13 division ratio $K_2=6$.
(3) Branch 11 division ratio $n_1=K_1.K_2=24$.
(4) Stage 22 division ratio $K_3=5$.
(5) Stage 23 division ratio $K_4=5$.
(6) Branch 21 division ratio $n_2=K_3.K_4=25$.

The division ratio of the dividing device IV is equal to $$\frac{n_1.n_2}{n_1-n_2}$$

that is 600.

Consequently, the beat frequency $f$ at the output of the mixing and filtering device 36 is equal to $$\frac{10,000}{600}$$

that is 16⅔ cycles per second.

The motor M, connected to the hands *a*, *b*, *c*, by the transmission device R, drives these hands directly and continuously when the motor is a synchronous one, or by jerks in the case of an impulse motor.

The frequency of 16⅔ cycles per second has, in the case of a horal instrument, the advantage of being equal to the ratio $$\frac{100}{6}$$

that is to say that it is a multiple of 10 and of 6 (decimal and sexagesimal), that presents certain advantages for the transmission device R, as the reduction ratios are integers.

It is clear that any division ratios $n_1$ and $n_2$ could be chosen. However, it is advantageous that the difference between said two ratios will be equal to unity, in order to obtain the highest possible ratio $F/f$ by means of a minimum of elements, which is of importance when it is desired to limit the size and the consumption.

One of the essential advantages of this dividing device IV is that there is obtained a very low frequency (lower than 50 cycles/sec. and reaching possibly 1 cycle/sec.) without utilization of low frequency division stages, the consumption and size of which are prohibitive. Moreover, the operation at the input of the dividing device IV with frequencies comprised between ten and higher kilocycles/sec. and at the output of the branches 11, 21 with frequencies $u_1$, $u_2$ comprised between 200 and 500 cycles/sec. enables the dividing device IV to realize regenerating division circuits, which can be constituted by means of autopolarized transistors, and which, among all the division devices known up to now, are reaching a minimum of consumption and size. Lastly, this type of division device IV enables too, as the obtained frequency is low (lower than 50 cycles/sec.), the provision of the horal instrument with a synchronous or impulse motor running at low speed, so that by adequate study of its various parts one can render the friction losses practically negligible and can effect a motor having overall sizes and a consumption far smaller than those of the motors generally used in quartz clocks, the running speed of which is higher as they are fed by currents the frequencies of which are between 50 and 1,000 cycles/sec. The practical tests made have proved that overall sizes and the consumption of this motor are smaller than the overall sizes and the consumption of any electronic division system by which it could possibly be replaced.

These various particularities enable the realization of a horal indicating device driven by a motor of a very low power (lower than 3 milliwatts), which according to tests made, can even be lower than 1 milliwatt if care has been taken to attend very especially to the manufacture of the gears and bearings of the transmission device, as well as to the manufacture of the motor itself.

The tests made have further proved, that by a judicious choice of the various component parts of the described instrument and the principal data of which have been mentioned above, it is possible to realize a horal instrument of high precision (variation during 24 hours lower than $\frac{1}{10}$ of second) with overall sizes at the most equal to one cubic decimeter and the feeding device of which has a sufficient running reserve to insure reserve power for the battery 2 in order that, in the event of a very cloudy sky and negligible illumination, the daily exposure of the photo-sensitive cells may ensure an unlimited running of the instrument.

Another advantage of the described instrument is due to the fact that the quartz oscillator II constitutes the basic device of the instrument, so that the beat frequency $f$ follows strictly all variations of the frequency F of this standard oscillator (same relative error, etc.). On the contrary, if the oscillator stops, the indicator stops too, which constitutes a real advantage of the described instrument, with regard to known quartz clocks.

The various electronic parts of the described instrument (oscillator, coupling stage, division stages, amplifying mixing and filtering stages) are each preferably constituted by an easily interchangeable unit, the regularity of the manufacture in mass production being possibly secured by moulding and by printed circuits.

The described division device IV enables furthermore, on the one hand, the operation always in sinusoidal operating conditions, which saves the trouble of setting in form, transformations of form, etc., which require additional elements causing losses and a higher consumption and, on the other hand, the realization of a device in which the phase difference between the input frequency F to be divided and the final frequency $f$ remains strictly constant. It follows that the instrument does not present transient variations due to transient variations of this phase difference angle.

The whole described instrument is thus especially designed in order to realize a high precision instrument having a total consumption at the most equal to 15 milliwatts, which can however be reduced to less than 5 milliwatts, in order to make it thus independent of any electric energy supply system and having, furthermore, a size at the most equal to a cubic decimetre and a weight of the order to one kilo, in order to obtain an instrument easily transportable and able to be utilized in an instrument panel.

One form of the horal instrument, which is the object of the invention and especially designed in view of the realization of an instrument of a small overall size and low consumption, has been described here by way of example and with reference to the attached drawing.

However, it goes without saying that many embodiments can be foreseen. Thus, for example, instead of transistors, electronic tubes could be provided. In that case, however, the size would be larger and the consumption would be such that it probably could not be possible to provide the feeding by photo-sensitive cells, so that the horal instrument should be equipped either with a feeding block connected to an electric current supplying network, or with batteries being recharged by a recharging device of known type.

However in another embodiment, unless the described instrument is provided with a static and dynamic thermic compensation by means of elements having inversed thermic properties, it may be of advantage when one desires a still higher precision (and if of course in cases where higher feeding consumptions are imposed) to subject the whole horal instrument to thermostatic control. Such a thermostatic control is easy to fulfil for the instrument is of small size. This peculiarity constitutes an advantage with respect to the known quartz clocks (which present a great volume) and the precision thus obtained by such horal instruments may approach the precision of the quartz clocks used by the observatories.

On the other hand, the supplementary consumption necessary for the thermostatic control is not limiting the "transportability" of the instrument, because on a ship or in an aircraft, for instance, the electric power is always far sufficient for the feeding of such an instrument and to effect its thermostatic control.

In another embodiment, not only the quartz could be thermo-compensated, but also other parts of the horal instrument. Further when it is desired to have an enlarged temperature range and greater stability, it is advantageous to polarize the transistors according to a standard scheme, instead of the above described "autopolarisation" of the transistors.

We claim:

1. A horal instrument of high precision of the kind comprising a thermocompensated quartz oscillator the frequency of which is higher than 500 cycles, an electronic dividing device controlled by said quartz oscillator, a feeding device feeding said oscillator and said electronic dividing device with electrical energy, said electronic dividing device including two parallel branches of division stages, each of said branches having a different division factor and consequently different output frequencies, a mixing and filtering device fed by said two different output frequencies and delivering the low beat frequency of said two different output frequencies to a motor in said horal instrument, and horal indicating apparatus driven by said motor.

2. A horal instrument of high precision as claimed in claim 1, in which said feeding device is an independent and transportable one comprising photosensitive cells and accumulator batteries charged by said photosensitive cells.

3. A horal instrument of high precision as claimed in claim 1, in which each of said frequency dividing branches comprises several division stages including an autopolarized junction transistor connected in a regenerative manner.

4. A horal instrument of high precision comprising an independent and portable feeding device having photosensitive cells and accumulator batteries, a thermocompensated oscillator and an electronic dividing device, said oscillator energized by said feeding device and said dividing device controlled by said oscillator, said dividing device comprising parallel branches of division stages, each of said division stages including transistors connected in a regenerative manner, each of said branches having a different division factor resulting in different output frequencies, and said dividing device further comprising a mixing and filtering device fed by said two different output frequencies and delivering a low beat frequency of said two different output frequencies to a motor in said horal instrument.

5. A horal instrument of high precision as claimed in claim 1, in which the difference between the division factor of each branch is equal to unity.

References Cited in the file of this patent

UNITED STATES PATENTS

| | | |
|---|---|---|
| 1,884,547 | Bower | Oct. 25, 1932 |
| 1,927,895 | MacGrahan | Sept. 26, 1933 |
| 1,936,684 | Mazur | Nov. 28, 1933 |
| 2,714,661 | Norton | Aug. 2, 1955 |